United States Patent [19]
Ligon et al.

[11] Patent Number: 5,400,205
[45] Date of Patent: Mar. 21, 1995

[54] BREAKER FAIL-SAFE SYSTEM FOR A MULTI-CHANNEL ELECTRIC POWER GENERATING SYSTEM

[75] Inventors: Robert D. Ligon; Jeffery Emmerich, both of Rockford, Ill.

[73] Assignee: Sundstrand Corporation, Rockford, Ill.

[21] Appl. No.: 79,113

[22] Filed: Jun. 17, 1993

[51] Int. Cl.⁶ .............................................. H02H 3/00
[52] U.S. Cl. ...................................... 361/62; 361/65
[58] Field of Search .................. 361/20, 62, 63, 65, 361/67, 59; 307/84, 86

[56] References Cited

U.S. PATENT DOCUMENTS

| | | | |
|---|---|---|---|
| 4,236,186 | 11/1980 | Takagi | 361/65 |
| 4,731,688 | 3/1988 | Nimmergj et al. | 361/65 |
| 4,879,624 | 11/1989 | Jones et al. | 361/69 |
| 5,341,268 | 8/1994 | Ishiguro et al. | 361/65 |

*Primary Examiner*—Todd Deboer
*Attorney, Agent, or Firm*—Jeffery J. Makeever

[57] ABSTRACT

A nonvolatile fail-safe system providing protection from bus fault propagation for a multi-channel electric power generating system includes a controller which provides excitation control and protection for a first generator unit, position control for its generator control breaker (GCB) and position control for a bus tie breaker (BTB); protection logic which generates a trip signal for the BTB when a bus fault is detected isolating the load distribution bus from the tie bus, and thereafter generating an excitation isolation control signal and a GCB trip signal isolating the load distribution bus from the generator unit upon sustained presence of the bus fault. A latching generator control relay is electrically coupled in series with the excitation control and is responsive to the excitation isolation control signal for de-energizing the generator by isolating the excitation control. A circuit monitors the operational status of the controller and generates a breaker fail-safe signal upon sensing operation outside acceptable parameters; and fail-safe logic, responsive to the position status of the generator control relay at the instant of issuance of the breaker fail-safe signal, controls the position of the BTB upon failure of the controller.

7 Claims, 3 Drawing Sheets

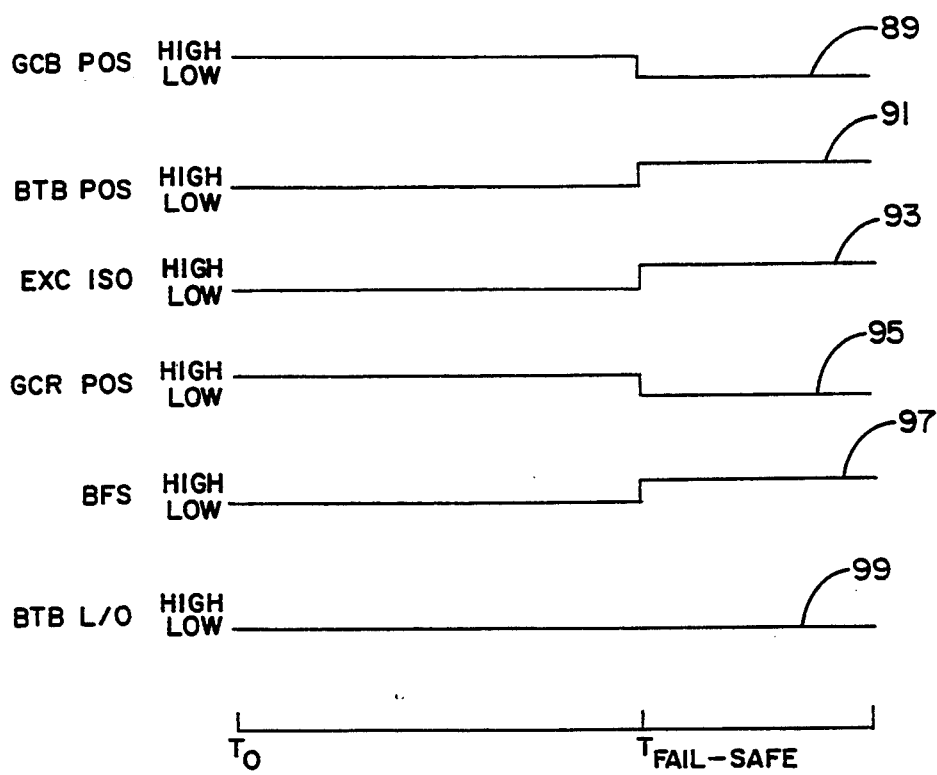
FIG. 3
FIG. 4
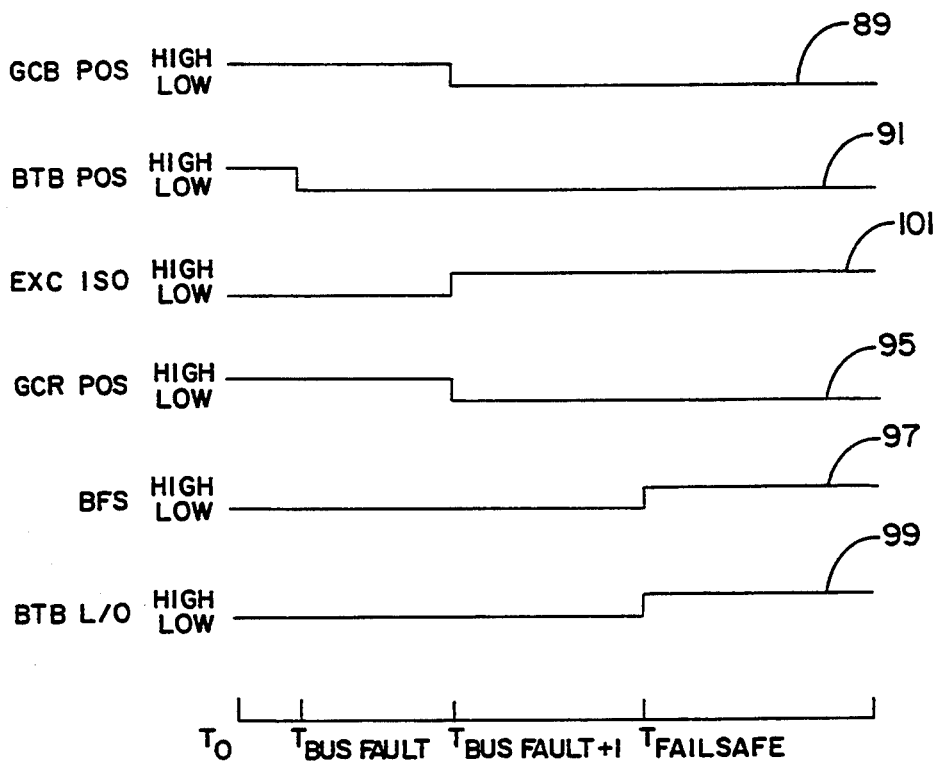

BREAKER FAIL-SAFE SYSTEM FOR A MULTI-CHANNEL ELECTRIC POWER GENERATING SYSTEM

FIELD OF THE INVENTION

The present invention relates generally to protection systems for aircraft electric power generating systems (EPGS), and more particularly to a nonvolatile fail-safe system of protection which will properly configure the system breakers to assure non-propagation of a bus fault upon controller failure.

BACKGROUND ART

FIG. 1 illustrates a prior art electric power generating system (EPGS) of the type manufactured by the assignee of the present invention for use in airframes. The EPGS 7 is comprised of a plurality of generating channels 37. Each channel comprises a generator unit such as an integrated drive generator 9 coupled to a power take-off (not illustrated) from an airframe propulsion engine. The output of the IDG 9 is connectable by a generator control breaker (GCB) 31 to a load distribution bus 23 which is connectable by a bus tie breaker (BTB) 29 to a tie bus 35. Each IDG 9 is conventional and is comprised of a constant speed transmission and a permanent magnet generator which generates alternating current which is rectified and applied to a wound field exciter which produces alternating current which is rectified and applied to the rotor of a three phase alternator. The number of IDGs 9 included in the EPGS 7 varies directly with the number of engines on the airframe and typically is between 2 and 4. The rotor of the three phase alternator is driven by the constant speed transmission (included within the IDG 9) which converts a variable speed power take-off from the airframe propulsion engine into a constant speed shaft drive which rotates the rotor of the three phase alternator at a velocity for producing three phase 400 Hz electrical power. Each IDG 9 has an associated generator control unit (GCU) 11 which may contain a programmed microprocessor or other means for implementing various conventional control and protection functions as well as functions which are described below which are part of the present invention.

In addition to the main engine driven IDGs 9, an auxiliary power unit driven generator unit (AGEN) 13 is often included as an integral pan of the EPGS 7. The AGEN 13 is connectable by an auxiliary power breaker (APB) 39 to the tie bus 35 to allow the AGEN 13 to power the main channel load busses 23 via the BTBs 29 during IDG fault or loss of engine conditions, or while on the ground without main engines running. As with the IDGs 9, the AGEN 13 has an associated generator control unit (AGCU) 15 which also may contain a programmed microprocessor or other means for implementing various conventional control and protection functions. Often the GCU 11 and the AGCU 15 are identical units, differing only in the control algorithms executed by the microprocessor. Also included is a connection 17 to allow external power (EXT PWR) to be connected to the tie bus 35 to supply the main channel's load distribution busses 23 through the BTBs 29 while on the ground.

The generator control unit 11 is conventional. The GCU 11 contains a generator control relay (GCR) (not shown) which controls the connection of electric power generated by the permanent magnet generator to the wound field exciter via line 19 which upon disconnection disables the generator unit from generating electric power. In the prior art EPGS 7 the GCR is a latching relay which opens in the event of a GCU failure or a protective trip, de-energizing the IDG 9 thereby. In this way the generating channel with the associated failed GCU 9 reverts to a safe configuration with the IDG 9 off line.

The protection logic executed within the GCU 11 utilizes a generator current transformer housed within the IDG 9 to monitor the current generated by the IDG 9. The current information is transmitted to the GCU's protection logic via line 21 where it is compared to the current information as monitored by a line current transformer located at the load distribution bus 23 and transmitted via line 25. If the current generated by the IDG 9 does not equal that being delivered to the load distribution bus 23, a differential current bus fault (a single or multiple phase to ground or phase to phase short circuit) exists. In response to the sensed fault, the protection logic trips open the BTB 29 via BTB control line 27 and continues to monitor for the existence of the fault. If the fault persists, the protection logic trips open the GCB 31 via GCB control line 33 and also de-energizes the IDG 9 by allowing the GCR to open. In similar fashion an overcurrent condition, a single or multiple phase to ground or phase to phase short circuit fault downstream of the line current transformer (on the load distribution bus itself), will result in the isolation of the load distribution bus 23.

For generator faults such as over or under voltage generation as sensed on line 41 at the point of regulation 43, the protection logic trips open the GCB 31 to disconnect the IDG 9 from the load distribution bus 23, allows the GCR to open to de-energize the IDG 9 and closes the BTB 29 to allow an alternate source to power the loads via the tie bus 35.

In addition to the protection logic functions described above, protection against GCU microprocessor faults and power interruptions is included within the GCU 11 to allow the channel 37 to fail in a safe configuration, hereinafter fail-safe protection. Traditionally, a nonvolatile latching device set by the main protection is used by the fail-safe protection to determine the appropriate control action in the event of a GCU failure or power interruption. By using this information, the fail-safe protection can properly configure the channel 37 during the fault or interruption, as well as reconfigure it after the GCU 11 is reset or power is restored. If the fail-safe logic were to close the BTB 29 to allow an alternate source of electrical energy to power the load distribution bus 23 without first determining if a bus fault had existed, for example as a result of a differential current fault being present on the load distribution bus 23, the alternate source of electrical energy could be connected to the faulted load distribution bus 23, resulting in the loss of, or potentially damage to, the alternate source. For a two engine aircraft an error of this type could have very serious consequences resulting in the loss of primary power to the entire aircraft. Two problems associated with using this separate nonvolatile latching device to ensure non-propagation of a bus fault are that it 1) increases the cost and 2) decreases the reliability of the GCLI 11 based on the increased parts required.

The present invention is directed to overcoming one or more of the above problems through the use of a latching multiple pole GCR, improved fail-safe logic, and the deletion of the nonvolatile latching device.

SUMMARY OF THE INVENTION

It is the principle objective of the instant invention to provide a new and improved fail-safe system of protection for an aircraft electric power generating system (EPGS), and more specifically, a nonvolatile fail-safe system of protection which will properly configure the EPGS breakers to allow maximum power utilization by the aircraft loads while ensuring that a bus fault is not propagated to alternate sources.

The nonvolatile fail-safe system will provide protection from bus fault propagation for the multi-channel EPGS by having a first generator unit connectable through a first latching breaker to a load distribution bus. The load distribution bus is connectable through a second latching breaker to a tie bus which is connectable to at least one additional generator unit. This nonvolatile fail-safe system comprises a controller which provides excitation control and protection for its associated generator unit, as well as position control for the first breaker via a first trip control signal and a first close control signal, and for the second breaker via a second trip control signal and a second close control signal. System protection logic is also contained within the controller for generating the second trip control signal when a bus fault is detected. The second breaker opens in response to this signal, isolating the load distribution bus from the tie bus in an attempt to isolate the fault. The protection logic continues to monitor the load distribution bus for sustained presence of the fault. Thereafter, if the fault was not cleared by tripping the second breaker, the protection logic generates an excitation isolation control signal and the first trip control signal to de-energize and isolate the load distribution bus from the first generator unit.

A latching generator control relay is electrically coupled in series with the excitation control of the controller, and is responsive to the excitation isolation control signal for isolating the excitation control from the first generator unit, de-energizing the first generator unit thereby. Also contained within the controller is a circuit which monitors the operational status of the controller. This monitoring circuit generates a breaker fail-safe control signal upon sensing that the controller operation is outside acceptable operating parameters. The fail-safe logic of the controller, upon issuance of this breaker fail-safe signal, controls the position of the second breaker based the position status of the generator control relay at the instant of issuance of the breaker fail-safe control signal.

Other objectives and advantages will become apparent/Yore the following specification taken in conjunction with the accompanying drawings.

BRIEF DESCRIPTION OF THE DRAWINGS

Reference is now made to the Description of the Preferred Embodiments, taken in conjunction with the accompanying illustrations, in which:

FIG. 3 illustrates a timing diagram of the instant invention under a no system fault followed by a controller fail-safe condition scenario;

FIG. 4 illustrates a timing diagram of the instant invention under a bus fault followed by a controller fail-safe condition scenario.

DESCRIPTION OF THE PREFERRED EMBODIMENTS

Throughout the following description, the generic term "block" will be utilized as a convenient way of referring to the circuit elements and associated wiring and control logic which perform the functions described.

Figure 1:
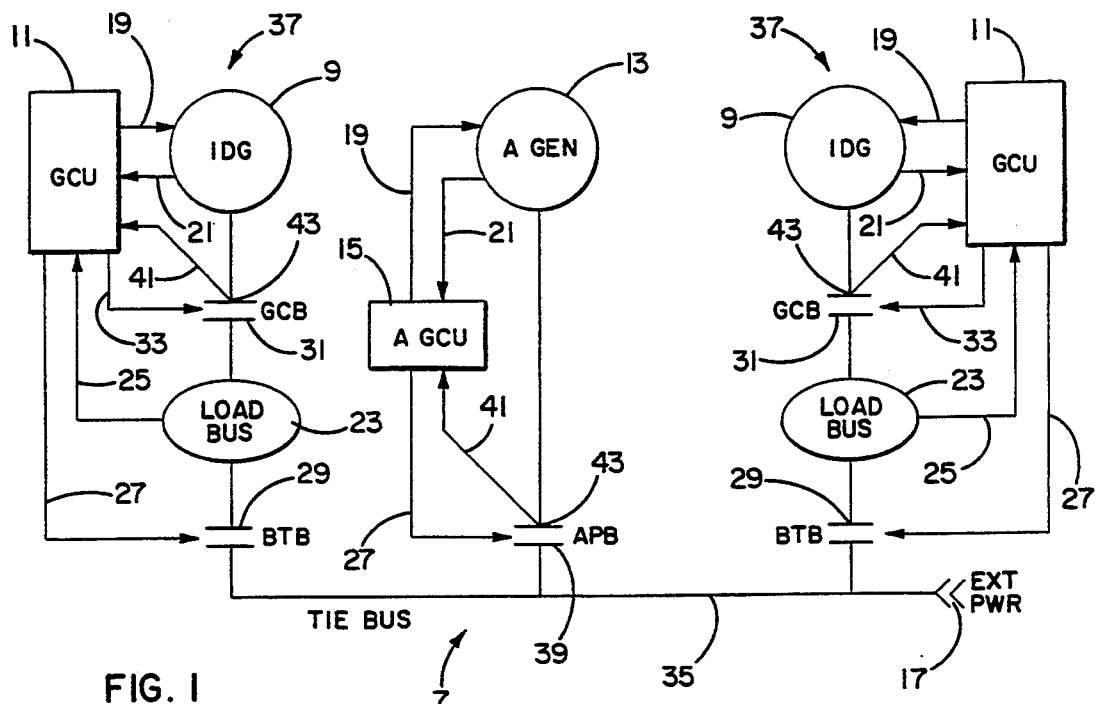
FIG. 1 illustrates a prior art single line diagram of a two channel aircraft electric power generating system of the type manufactured by the assignee of the instant invention.
Figure 2:
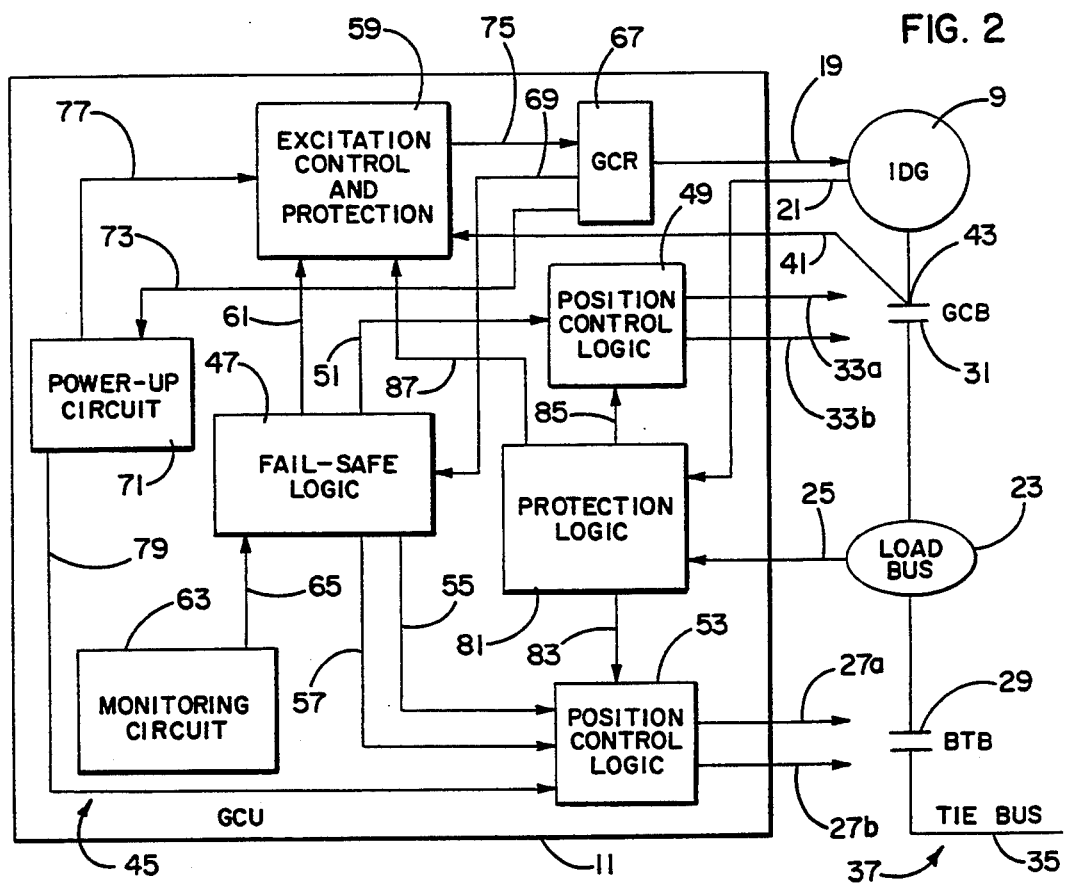
FIG. 2 illustrates a block diagram of the controller of the instant invention.

FIG. 2 depicts a block diagram representation of an embodiment of the nonvolatile fail-safe system 45 in accordance with the instant invention. Like reference numerals identify like parts in FIGS. 1 and 2. The fail-safe system 45 of the instant invention is preferably implemented within the generator control unit 11 of the type illustrated in FIG. 1 which utilizes a programmed microprocessor or other suitable processor. The logic functions contained in the fail-safe system 45 may be implemented in hardware or software or combinations thereof.

This fail-safe system of protection 45 is contained within a controller, hereinafter generator control unit (GCU) 11, and interfaces with a single channel 37 of a multi-channel electric power generating system. The single channel is comprised of a generator unit, as illustrated by the integrated drive generator (IDG) 9, connectable by a first latching breaker, hereinafter generator control breaker (GCB) 31, to a load distribution bus 23. The load distribution bus 23 is connectable by a second latching breaker, hereinafter bus tie breaker (BTB) 29, to a tie bus 35 which is connectable to at least one additional generator unit.

Within the GCU 11, the fail-safe logic means 47 interfaces with the position control logic 49 for the GCB 31 via the GCB fail-safe trip line 51, and with the position control logic 53 for the BTB 29 via the BTB fail-safe trip line 55 and the BTB fail-safe lock-out control line 57. The fail-safe logic means 47 also interfaces with the excitation control and protection block 59 via the fail-safe excitation isolation control line 61, with the monitoring circuit means 63 via the breaker fail-safe control line 65, and with the generator control relay (GCR) 67 via the GCR fail-safe position status line 69. The position status of the GCR 67 is also transmitted to a power-up circuit means 71 via a GCR power-up position status line 73. As discussed above, the GCR 67 is coupled in series with a exciter control output power line 75 from the excitation control and protection block 59 and the exciter field power line 19 which is coupled to the IDG 9.

The power-up circuit means 71, in addition to interfacing with the GCR 67, also interfaces with the excitation control and protection block 59 via a power-up initialization line 77. The power-up circuit means 71 also interfaces with the BTB position control logic means 53 via a power-up BTB lock-out control line 79. In addition to this input, the BTB position control logic means 53 also receives an input from the protection logic means 81 via a BTB trip protection line 83. The output of the BTB position control logic means 53 is transmitted to the latching BTB 29 via a BTB trip control line 27a and a BTB close control line 27b. The output of the GCB position control logic means 49 is transmitted in like manner to the latching GCB 31 via a GCB trip control line 33a and a GCB close control line 33b. Also in like manner as the BTB position control logic means 53, a GCB trip protection line 85 provides the interface with the protection logic means 81. The protection logic means 81 has inputs connected to the IDG 9 via a generator current transformer line 21 and from the load distribution bus 23 via a line current transformer line 25. The protection logic means 81 also interfaces with the excitation control and protection block 59 via a first excitation isolation control line 87. The excitation control and protection block 59, as discussed above, receives information from the point of regulation (POR) 43 via the POR sense line 41.

In the preferred embodiment of the instant invention, the fail-safe system of protection 45 provides protection from bus fault propagation for the multi-channel EPGS (see FIG. 1) having an IDG 9 connected by a latching GCB 31 to a load distribution bus 23 which in turn is connected by a latching BTB 29 to a tie bus 35, with the tie bus 35 connected to at least one additional generator unit. This nonvolatile fail-safe system 45 comprises a GCU 11 which provides excitation control and protection for its associated IDG 9, as well as position control logic means for the GCB 31 via a first trip control signal transmitted via line 33a and a first close control signal transmitted via line 33b, and for the BTB 29 via a second trip control signal transmitted via line 27a and a second close control signal transmitted via line 27b. System protection logic means 81 is also contained within the GCU 11 for generating the second trip control signal when a bus fault is detected. The BTB 29 opens in response to this signal, isolating the load distribution bus 23 from the tie bus 35 in an attempt to isolate the fault. The protection logic 81 continues to monitor the load distribution bus 23 for sustained presence of the fault. Thereafter, if the fault was not cleared by tripping the BTB 29, the protection logic means 81 generates an excitation isolation control signal and the first trip control signal to de-energize and isolate the load distribution bus 23 from the IDG 9.

A latching generator control relay 67 is electrically coupled in series with the excitation control and protection block 59 of the GCU 11, and is responsive to the excitation isolation control signal for isolating the excitation control from the first generator unit, de-energizing the first generator unit thereby. Also contained within the controller 11 is a circuit which monitors the operational status of the controller. This monitoring circuit generates a breaker fail-safe control signal upon sensing that the controller operation is outside acceptable operating parameters. The fail-safe logic of the controller, upon issuance of this breaker fail-safe signal, controls the position of the second breaker 29 based the position status of the generator control relay 67 at the instant of issuance of the breaker fail-safe control signal.

In a further embodiment of the fail-safe system 45, the fail-safe logic means 47 generates the second close control signal when the position status of the GCR 67 at the instant of issuance of the breaker fail-safe control signal indicates that the GCR 67 is in the closed position. The BTB 29 closes in response to this second close control signal, connecting the load distribution bus 23 to the tie bus 29. This allows an alternate source of power, which is connected to the tie bus 35, to supply electric power to the loads connected to the load distribution bus 23. Alternately, the fail-safe logic means 47 generates a second breaker lock-out control signal when the position status of the GCR 67 at the instant of issuance of the breaker fail-safe control signal indicates that the GCR 67 is in the open position. This lock-out control signal disables the generation of the second close control signal and the second trip control signal thereby. Further, the fail-safe logic means 47 generates the first trip control signal and a second excitation isolation control signal subsequent to the issuance of the breaker fail-safe control signal, the GCB 31 and the GCR 67 tripping in response thereto, de-energizing and isolating the IDG 9 from the load distribution bus thereby.

In a further embodiment of instant invention, a power-up circuit means 71 is contained within the GCU 11 and is responsive to power application to the GCU 11 for initializing the excitation control and protection block 59 for the IDG 9 and the position control logic means 53 for the BTB 29. This power-up circuit means 71 generates a second breaker lock-out control signal when the position status of the GCR 67, at the instant of power application to the GCU 11, indicates that the GCR 67 is in the open position. The lock-out control signal disables the generation of the second close control signal thereby.

Preferably, the generator control relay 67 of the instant invention is a multiple pole relay having at least one pole and contact coupled to the fail-safe logic means 47 providing position status information thereto.

FIG. 3 illustrates, via a time line diagram, the position status of the GCB (GCB POS) 89, the position status of the BTB (BTB POS) 91, the second excitation isolation control signal (EXC. ISO) 93 generated by the fail-safe logic means 47 (FIG. 2), the position status of the GCR (GCR POS) 95, the breaker fail-safe control signal (BFS) 97 generated by the monitoring means 63 (FIG. 2), and the BTB lock-out control signal (BTB L/O) 99 generated by the fail-safe logic means 47, during normal single channel isolated operating conditions at $t_0$, followed by a GCU 11 failure requiring the fail-safe logic means 47 to operate. At time $t_0$ the GCR 67 and GCB 31 are both closed, as indicated by a high signal throughout in FIG. 3, allowing the IDG 9 to power its associated load distribution bus 23. The BTB 29 is open, as indicated by a low signal throughout in FIG. 3, indicating the isolated mode of operation. The EXC. ISO 93, BFS 97, and BTB L/O 99 signals are all inactive (low) indicating normal operating conditions. At time $t_{fail-safe}$ monitoring means 63 (FIG. 2) senses that the GCU 11 is operating outside of acceptable parameters, and sets the BFS 97 signal high. The fail-safe logic means 47 monitors the GCR POS 95 and, based on the GCR POS 95 signal indicating that the GCR 67 is closed, issues the GCB trip control signal, the second excitation isolation control signal, and the BTB close control signal. The channel response to these signals is to trip the GCB 31 and the GCR 67, as indicated by the low transitioning of the GCB POS 89 and the GCR POS 95 signals in FIG. 3, and to close the BTB 29, as indicated by the high transitioning of the BTB POS 91 signal, allowing an alternate source on the tie bus 35 to power the load distribution bus 23.

FIG. 4 illustrates, via a time line diagram having the position status of the GCB (GCB POS) 89, the position status of the BTB (BTB POS) 91, the first excitation isolation control signal (EXC. ISO) 101 generated by the protection logic means 81 (FIG. 2), the position status of the GCR (GCR POS) 95, the breaker fail-safe control signal (BFS) 97 generated by the monitoring means 63 (FIG. 2), and the BTB lock-out control signal (BTB L/O) 99 generated by the fail-safe logic means 47 as its display, the channel response to a differential current bus fault followed by a GCU 11 failure requiring the fail-safe logic means 47 to operate. At time $t_0$ the GCR 67, GCB 31, and BTB 29 are all closed, as indicated by a high signal in FIG. 4, allowing the IDG 9 to power its associated load distribution bus 23 as well as the tie bus 35. The EXC. ISO 93, BFS 97, and BTB L/O 99 signals are all inactive (low) indicating normal operating conditions. At time $t_{bus\ fault}$ a differential current bus fault is detected by the protection logic means 81 (FIG. 2). The protection logic means 81 trips the BTB 29, as indicated by the low transitioning of the BTB POS 91 signal, and continues to monitor for the fault condition. At time $t_{bus\ fault+1}$ the fault is still present and the protection logic means 81 issues the EXC. ISO 101 signal, as indicated by a high transitioning of the signal, and trips the GCB 31 and the GCR 67, as indicated by the low transitioning of the GCB POS 89 and GCR POS 95 signals. At this point the load distribution bus 23 is isolated and the IDG 9 is de-energized (if the BTB 29 had not been closed initially, the protection logic would close it at this time). At time $t_{fail-safe}$ monitoring means 63 (FIG. 2) senses that the GCU 11 is operating outside of acceptable parameters, and sets the BFS 97 signal high. The fail-safe logic means 47 monitors the GCR POS 95 and, based on the GCR POS 95 signal indicating that the GCR 67 is open, issues the BTB L/O 99 signal, as indicated by the high transitioning of the signal, locking out both the BTB close and the BTB trip control signals. This results in the faulted load distribution bus 35 being isolated, ensuring non-propagation of the bus fault.

Figure 5:
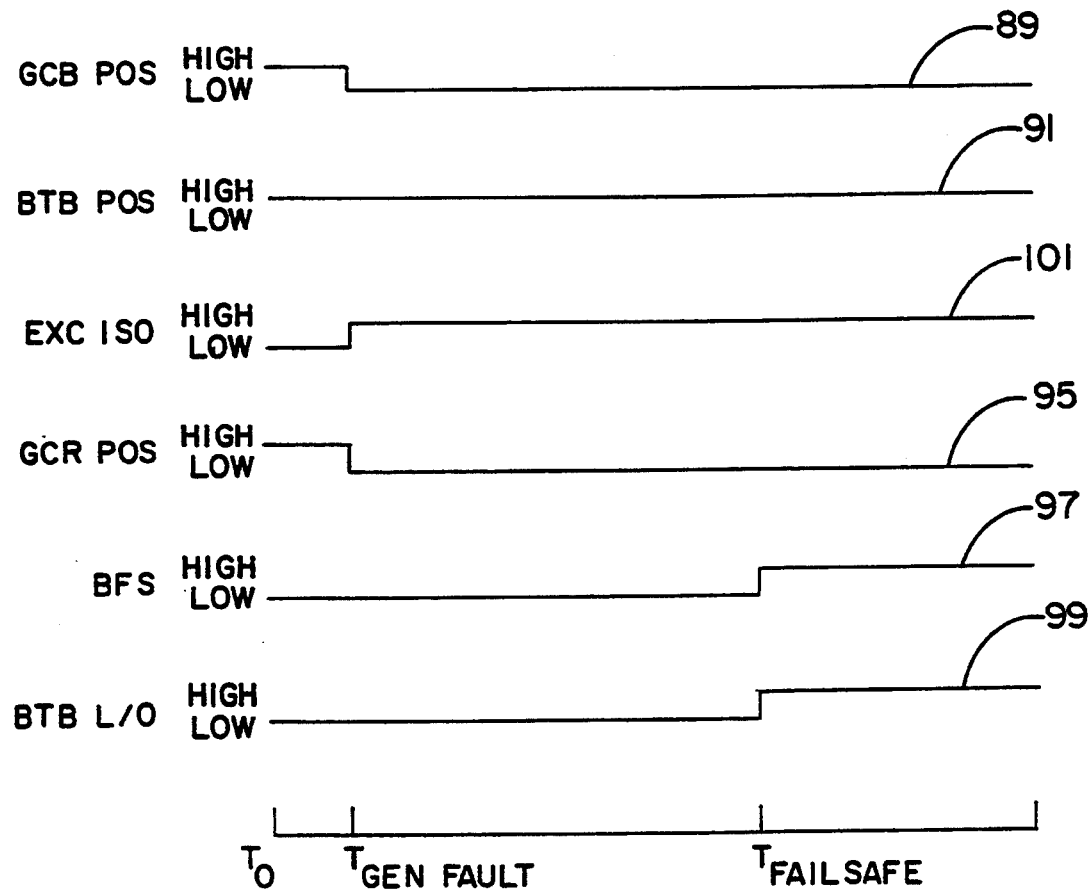
FIG. 5 illustrates a timing diagram of the instant invention under a generator unit fault followed by a controller fail-safe condition scenario.

FIG. 5 illustrates, via a time line diagram having the position status of the GCB (GCB POS) 89, the position status of the BTB (BTB POS) 91, the first excitation isolation control signal (EXC. ISO) 101 generated by the protection logic means 81 (FIG. 2), the position status of the GCR (GCR POS) 95, the breaker fail-safe control signal (BFS) 97 generated by the monitoring means 63 (FIG. 2), and the BTB lock-out control signal (BTB L/O) 99 generated by the fail-safe logic means 47 as its display, the channel response to an IDG fault, such as an over voltage condition, followed by a GCU 11 failure requiring the fail-safe logic means 47 to operate. At time $t_0$ the GCR 67, GCB 31, and BTB 29 are all closed, as indicated by a high signal in FIG. 5, allowing the IDG 9 to power its associated load distribution bus 23 as well as the tie bus 35. The EXC. ISO 93, BFS 97, and BTB L/O 99 signals are all inactive (low) indicating normal operating conditions. At time $t_{gen\ fault}$ an IDG fault is detected by the protection logic means 81 (FIG. 2). The protection logic means 81 issues the EXC. ISO 101 signal, as indicated by a high transitioning of the signal, and trips the GCB 31 and the GCR 67, as indicated by the low transitioning of the GCB POS 89 and GCR POS 95 signals. At this point the load distribution bus 23 is connected to the tie bus 35 and the IDG 9 is de-energized. At time $t_{fail-safe}$ monitoring means 63 (FIG. 2) senses that the GCU 11 is operating outside of acceptable parameters, and sets the BFS 97 signal high. The fail-safe logic means 47 monitors the GCR POS 95 and, based on the GCR POS 95 signal indicating that the GCR 67 is open, issues the BTB L/O 99 signal, as indicated by the high transitioning of the signal, locking out both the BTB close and the BTB trip control signals. This allows the load distribution bus 23 to be power by an alternate source via the tie bus 35.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A nonvolatile fail-safe system providing protection from bus fault propagation for a multi-channel electric power generating system having a first generator unit connectable by a first breaker to a load distribution bus connectable by a second breaker to a tie bus with the tie bus connectable to at least one additional generator unit, comprising:

a controller providing excitation control and protection for the first generator unit, position control for the first breaker via a first trip control signal and a first close control signal, and position control for the second breaker via a second trip control signal and a second close control signal;

protection logic means for generating said second trip control signal when a bus fault is detected, opening the second breaker and isolating the load distribution bus from the tie bus thereby, said protection logic means thereafter generating a first excitation isolation control signal and said first trip control signal isolating the load distribution bus from the first generator unit upon sustained presence of the bus fault;

a latching generator control relay electrically coupled in series with said controller, said generator control relay responsive to said excitation isolation control signal for isolating said excitation control from the first generator unit, de-energizing the first generator unit thereby;

circuit means for monitoring the operational status of said controller, said monitoring means generating a breaker fail-safe control signal upon sensing controller operation outside acceptable parameters; and fail-safe logic means responsive to the position status of said generator control relay at the instant of issuance of said breaker fail-safe control signal for controlling the position of the second breaker upon failure of said controller.

2. A nonvolatile fail-safe system as recited in claim 1, wherein said fail-safe logic means generates said second close control signal when said position status of said generator control relay at the instant of issuance of said breaker fail-safe control signal indicates that said generator control relay is in the closed position, the second breaker closing in response to said second close control signal thereby, connecting the load distribution bus to the tie bus, allowing the additional generator unit to supply electric power to the loads connected thereto.

3. A nonvolatile fail-safe system as recited in claim 1, wherein said fail-safe logic means generates a second breaker lock-out control signal when said position status of said generator control relay at the instant of issuance of said breaker fail-safe control signal indicates that said generator control relay is in the open position, said lock-out control signal disabling the generation of said second close control signal and said second trip control signal thereby.

4. A nonvolatile fail-safe system as recited in claim 3, wherein said fail-safe logic means generates said first trip control signal and a second excitation isolation control signal subsequent to the issuance of said breaker fail-safe control signal, the first breaker and said generator control relay tripping in response thereto, de-energizing and isolating the generator unit from the load distribution bus thereby.

5. A nonvolatile fail-safe system as recited in claim 1, further comprising a power-up circuit means responsive to power application to said controller for initializing said excitation control and protection for the generator unit and said position control for the second breaker, said power-up circuit means generating a second breaker lock-out control signal when said position status of said generator control relay at the instant of power application to said controller indicates that said generator control relay is in the open position, said lock-out control signal disabling the generation of said second close control signal thereby.

6. A nonvolatile fail-safe system as recited in claim 1, wherein said generator control relay is a multiple pole relay having at least one pole and contact coupled to said fail-safe logic means for providing position status information thereto.

7. A nonvolatile fail-safe system as recited in claim 1, wherein said fail-safe logic means disables the generation of said second close control signal and said second trip control signal when said position status of said generator control relay at the instant of issuance of said breaker fail-safe control signal indicates that said generator control relay is in the open position.

* * * * *